(12) United States Patent
Guh

(10) Patent No.: US 8,210,322 B2
(45) Date of Patent: Jul. 3, 2012

(54) BRAKE-ACTION SYNCHRONIZING DEVICE FOR A TWO-WHEELED VEHICLE

(76) Inventor: Cherng-Jye Guh, Taichung (TW)

( * ) Notice: Subject to any disclaimer, the term of this patent is extended or adjusted under 35 U.S.C. 154(b) by 428 days.

(21) Appl. No.: 12/615,356

(22) Filed: Nov. 10, 2009

(65) Prior Publication Data

US 2011/0056775 A1 Mar. 10, 2011

(30) Foreign Application Priority Data

Sep. 8, 2009 (TW) ................ 98216554 U

(51) Int. Cl.
*B62L 3/00* (2006.01)
(52) U.S. Cl. ................................................. 188/24.22
(58) Field of Classification Search .... 188/24.11–24.16, 188/24.22, 2 D, 2 F; 74/501.6, 500.5, 502.2, 74/502.4
See application file for complete search history.

(56) References Cited

U.S. PATENT DOCUMENTS

| | | | | |
|---|---|---|---|---|
| 4,057,127 A * | 11/1977 | Woodring | ................... | 188/24.16 |
| 4,526,057 A * | 7/1985 | Mochida et al. | ............. | 74/502.2 |
| 4,773,510 A * | 9/1988 | Sato | ........................... | 188/24.16 |
| 6,098,486 A * | 8/2000 | Liao | ............................ | 74/500.5 |
| 2007/0272499 A1* | 11/2007 | Shiao | ......................... | 188/24.11 |

FOREIGN PATENT DOCUMENTS

| | | | |
|---|---|---|---|
| FR | 2689083 A3 * | 10/1993 | |
| JP | 2000238686 A * | 9/2000 | |
| JP | 2004338611 A * | 12/2004 | |
| WO | WO 2006042442 A1 * | 4/2006 | |

* cited by examiner

*Primary Examiner* — Xuan Lan Nguyen
(74) *Attorney, Agent, or Firm* — Reed Smith LLP

(57) ABSTRACT

A brake-action synchronizing device for a two-wheeled vehicle includes a force imparting unit which is disposed in a housing and which includes a first block secured to and moved with a front brake cable, a stage extending transversely from the first block, and a second block which is disposed in the housing and which is secured to a rear brake cable. When the front brake cable is pulled by virtue of a front braking action, the first block is caused to move toward a ceiling wall of the housing and lift the second block so as to pull the rear brake cable, thereby delivering braking forces to both rear and front wheels of the vehicle.

9 Claims, 7 Drawing Sheets

BRAKE-ACTION SYNCHRONIZING DEVICE FOR A TWO-WHEELED VEHICLE

CROSS-REFERENCE TO RELATED APPLICATION

This application claims priority of Taiwanese Application No. 098216554, filed on Sep. 8, 2009, the disclosure of which is herein incorporated by reference.

BACKGROUND OF THE INVENTION

1. Field of the Invention

This invention relates to a brake device for a two-wheeled vehicle, more particularly to a brake-action synchronizing device for a two-wheeled vehicle, such as a bicycle.

2. Description of the Related Art

Referring to FIGS. 1 and 2, a conventional brake-action synchronizing device 100 for a bicycle is shown to include a first block 12 coupled with a rear brake cable 11, and a second block 14 coupled with a front brake cable 13. When the front brake cable 13 is pulled in a longitudinal direction (Y) by virtue of a braking action of a front brake lever 16, the second block 14 is moved to lift the first block 12 so as to pull the rear brake cable 11, thereby synchronously braking front and rear wheels (not shown) of the bicycle. This can prevent application of a violent braking force to the front wheel, which may cause turning over of the bicycle. However, the first block 12 is liable to ram against an inner surface of an upper wall of a housing 15 when moved with the second block 14, which may result in disengagement of the first and second blocks 12,14 from the rear and front brake cables 11,13 and hence adversely affect the synchronous braking effect, and which may also result in deformation of the first block 12 and render replacement of the device necessary. Moreover, in case of an emergency, the user generally will grip the front and rear brake levers 16,17 to synchronously the brake front and rear wheels, and a relatively large braking force will be generated to stop the front and rear wheels abruptly, which may cause turning over of the bicycle. Furthermore, when it is desired to remove the device 100, the housing 15 needs to be detached and the first and second blocks 12,14 need to be removed respectively from the brake cables 13,11, which is inconvenient.

SUMMARY OF THE INVENTION

The object of the present invention is to provide a brake-action synchronizing device for a two-wheeled vehicle which has a prolonged service life, and which can prevent abrupt stopping of front and rear wheels of the vehicle in case of an emergency so as to avoid turning over of the vehicle.

According to this invention, the brake-action synchronizing device includes a housing defining an accommodation chamber which is adapted to receive cable bodies of front and rear brake cables of a two-wheeled vehicle so as to permit movement of the cable bodies along first and second routes, respectively, in a longitudinal direction. The accommodation chamber extends in the longitudinal direction to terminate at ceiling and bottom walls. A force imparting unit is received in the accommodation chamber, and includes a first block and a stage. The first block is secured to the cable body of the front brake cable, and has an upper portion extending in the longitudinal direction to terminate at an upper surface and defining a height, a lower portion which is brought to rest on the bottom wall when the front brake lever is in a non-activated state, and a first passage which extends through the upper and lower portions and along the first route for passage of the cable body of the front brake cable therethrough. The stage extends from the lower portion across the second route, and has an abutment surface confronting the bottom wall, a lifting surface lower than the upper surface by the height, and a bore which extends along the second route and through the abutment and lifting surfaces, and which is configured to permit the cable body of the rear brake cable to move freely when the rear brake lever is operated. A second block has a lifted surface confronting the lifting surface, and is secured to move with the cable body of the rear brake cable along the second route such that, when the rear brake lever is in a non-activated state, the lifted surface is kept in contact with the lifting surface. When the front brake cable is pulled by virtue of a front braking action, the first block is caused to move toward the ceiling wall and lift the second block so as to pull the rear brake cable, thereby delivering braking forces to both rear and front wheels of the vehicle.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
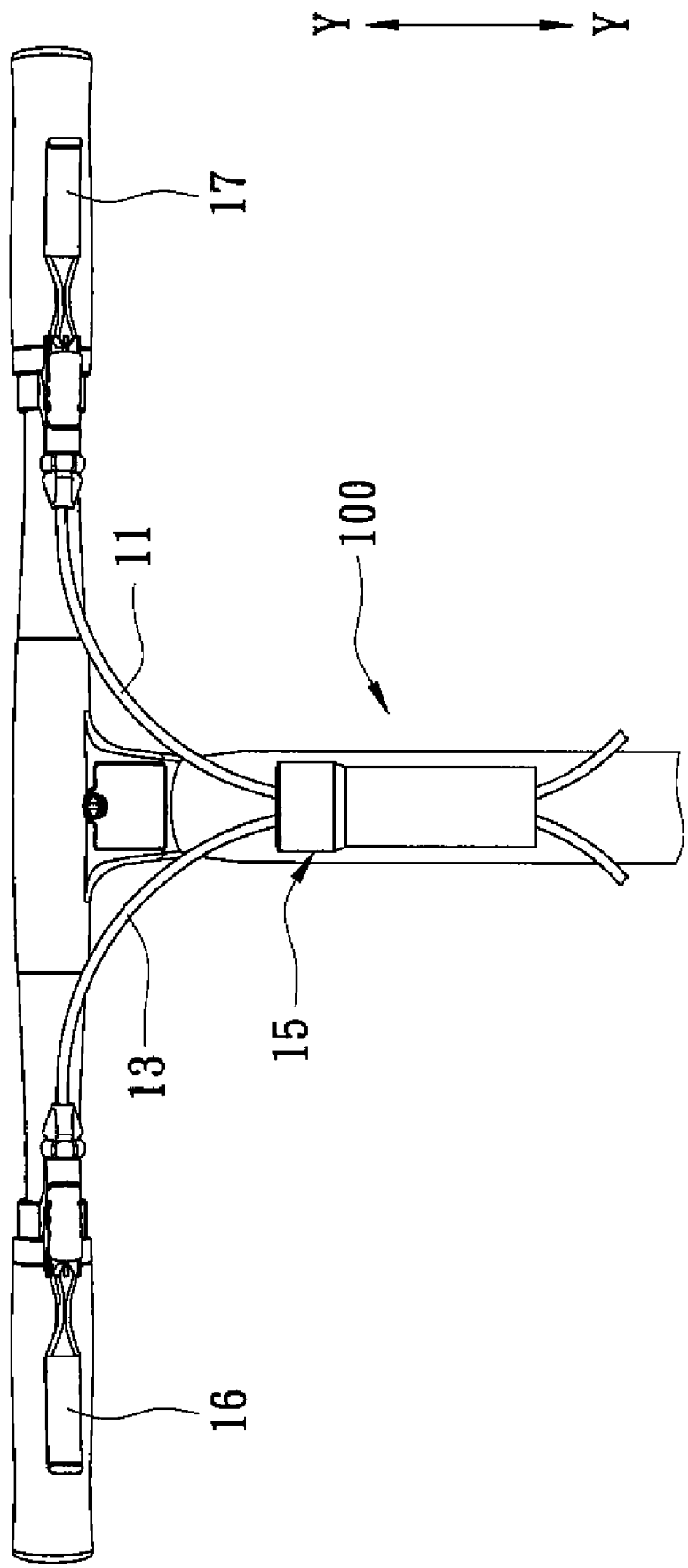
FIG. 1 is a schematic view of a conventional brake-action synchronizing device mounted on a bicycle.
Figure 2:
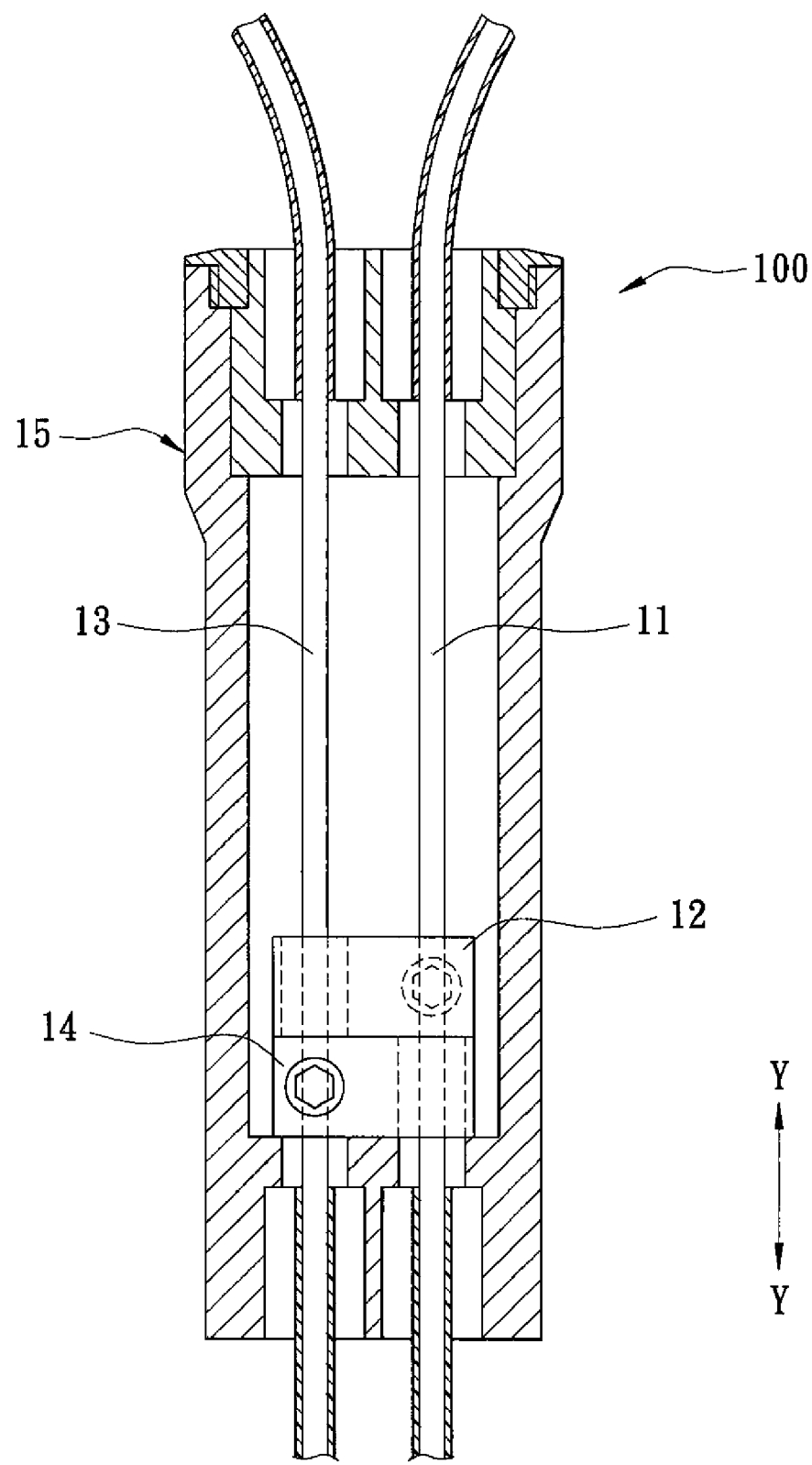
FIG. 2 is a sectional view of the conventional brake-action synchronizing device.
Figure 3:
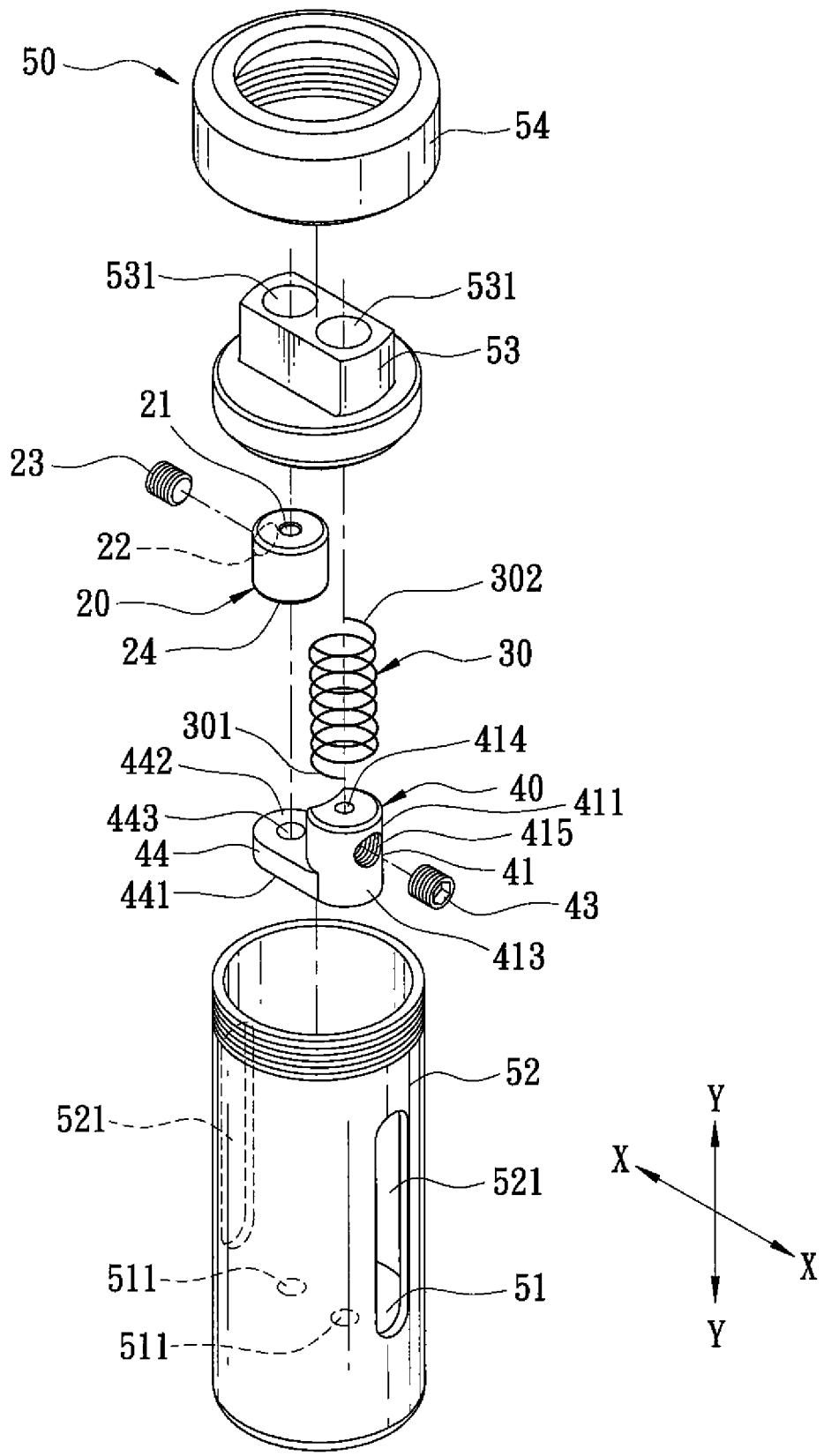
FIG. 3 is an exploded perspective view of the preferred embodiment of a brake-action synchronizing device according to this invention.
Figure 4:
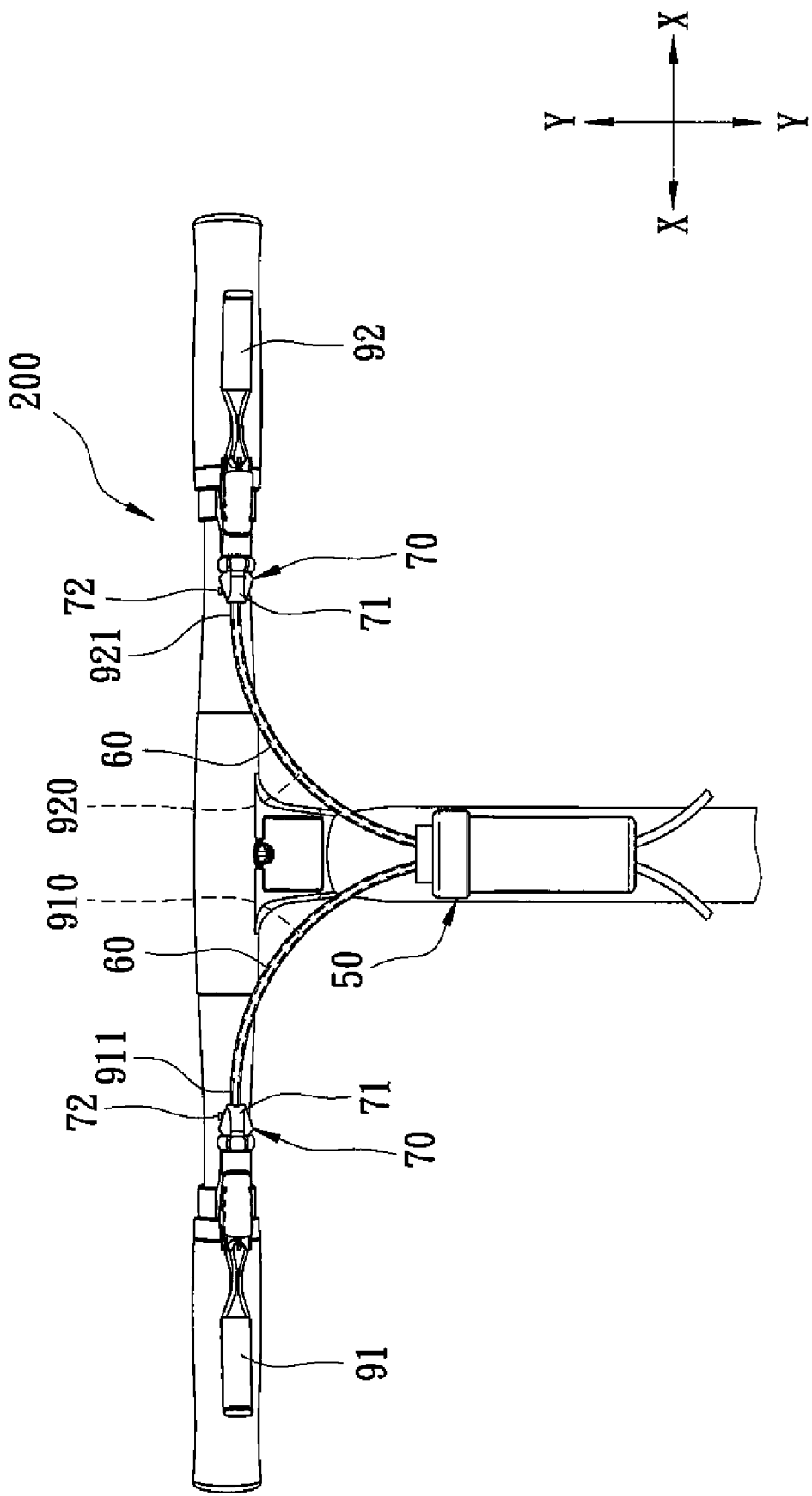
FIG. 4 is a schematic view of the preferred embodiment mounted on a bicycle.
Figure 5:
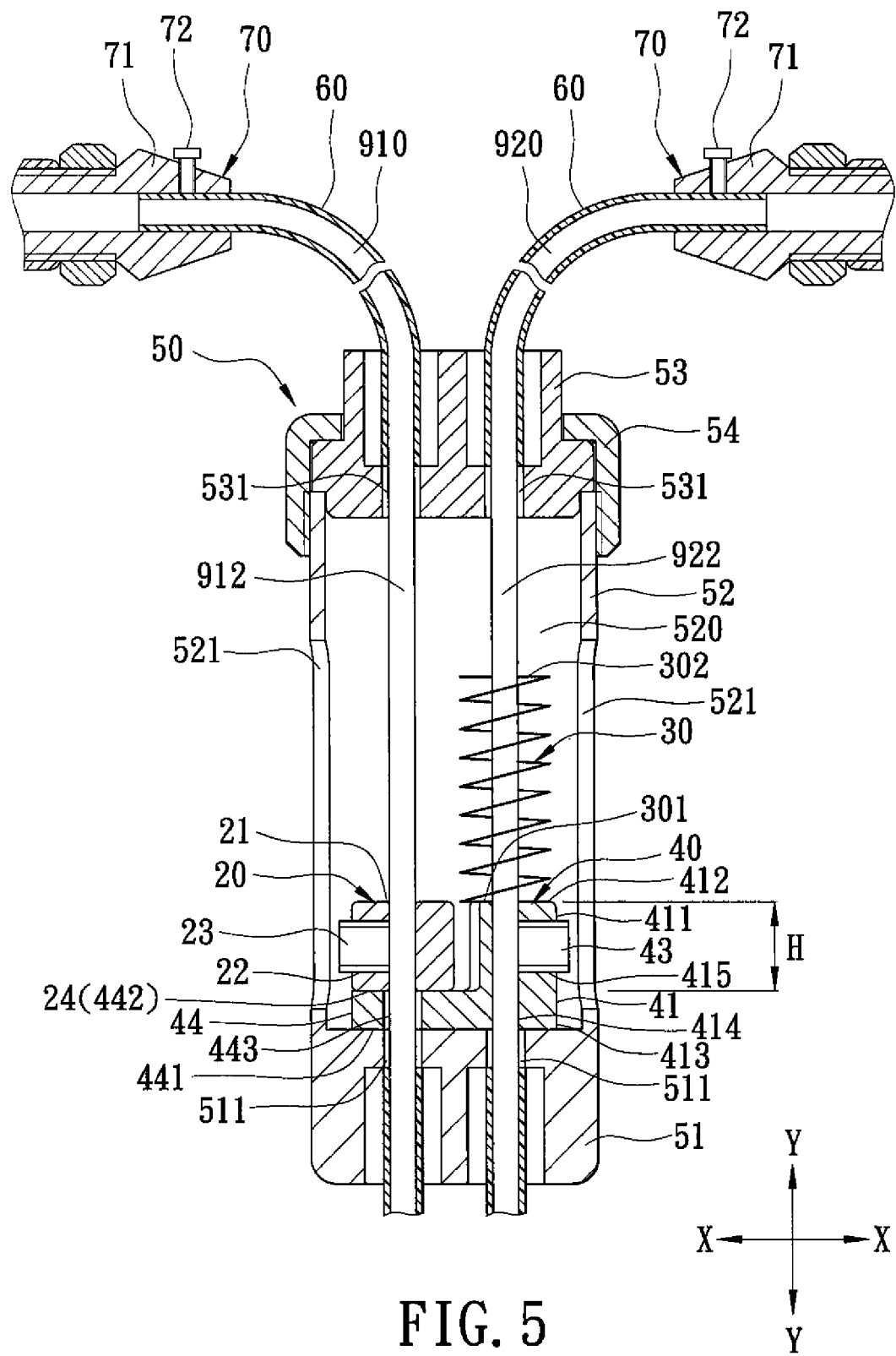
FIG. 5 is a sectional view of the preferred embodiment in a non-activated state.

Referring to FIGS. 3 to 5, the preferred embodiment of a brake-action synchronizing device 200 according to the present invention is adapted to be mounted on a two-wheeled vehicle, such as a bicycle (not shown), to cooperate with front and rear brake levers 92,91 and front and rear brake cables 920,910 of the bicycle. Each of the front and rear brake cables 920,910 has a proximate end 921,911 that is connected to a respective one of the brake levers 92,91, a distal end (not shown) that is disposed to deliver a braking force when the respective one of the brake levers 92,91 is operated to pull the proximate end 921,911, and a cable body 922,912 that is interposed between the proximate end 921,911 and the distal end. The brake-action synchronizing device 200 according to this embodiment is shown to comprise a housing 50, a force imparting unit 40, a second block 20, a biasing member 30, two tubular protective member 60, and two positioning members 70.

The housing 50 includes a surrounding wall 52 which defines an accommodation chamber 520 that is adapted to receive the cable bodies 922,912 of the front and rear brake cables 920,910 so as to permit movement of the cable bodies 922,912 along first and second routes, respectively, in a longitudinal direction (Y). The accommodation chamber 520 extends in the longitudinal direction (Y) to terminate at ceiling and bottom walls 53,51. Specifically, the ceiling wall 53 is secured to an upper end of the surrounding wall 52 by means of a lock ring 54 that is threadedly engaged with the surrounding wall 52, and has two upper through holes 531 respectively extending along the first and second routes so as to permit the cable bodies 922,912 of the brake cables 920,910 to move freely. The bottom wall 51 is integrally formed with the surrounding wall 52, and has two lower through holes 511 respectively extending along the first and second routes so as to permit the cable bodies 922,912 to move freely.

The force imparting unit 40 includes a first block 41 which has an upper portion 411 extending in the longitudinal direction to terminate at an upper surface 412 and defining a height (H), and a lower portion 913 that is opposite to the upper portion 411 in the longitudinal direction (Y). The first block 40 further has a first passage 414 which extends through the upper and lower portions 411,413 thereof and along the first route for passage of the cable body 922 of the front brake cable 920 therethrough, and a threaded hole 415 which extends in a radial direction (X) relative to the longitudinal direction (Y). A first fastening member 43 in the form of a screw bolt 43 is threadedly engaged with the threaded hole 415 to tightly abut against the cable body 922 of the front brake cable 920. When the front brake lever 92 is in a non-activated state, the lower portion 413 of the first block 40 is brought to rest on the bottom wall 51. A stage 44 is integrally formed with and extends from the lower portion 413 of the first block 41 across the second route, and has an abutment surface 441 which confronts the bottom wall 51 and which is flush with the lower portion 413 of the first block 41, and a lifting surface 442 which is opposite to the abutment surface 441 in the longitudinal direction (Y) and which is lower than the upper surface 412 by the height (H). The stage 44 has a bore 443 which extends along the second route and through the abutment and lifting surfaces 441,442, and which is configured to permit the cable body 912 of the rear brake cable 910 to move freely when the rear brake lever 91 is operated.

The second block 20 has a lifted surface 24 confronting the lifting surface 442, a second passage 21 which extends therethrough along the second route and which is configured to permit the cable body 912 of the rear brake cable 910 to be engagingly led therethrough, and a threaded hole 22 which extends in the radial direction (X). A second fastening member 23 in the form of a screw bolt is threadedly engaged with the threaded hole 22 to tightly abut against the cable body 912 of the rear brake cable 910 so as to secure the second block 20 to the cable body 912. Thus, when the rear brake lever 91 is in a non-activated state, the lifted surface 24 is kept in contact with the lifting surface 442, as shown in FIG. 5. On the other hand, the second block 20 can move with the cable body 912 of the rear brake cable 910 along the second route.

In addition, the surrounding wall 52 of the housing 50 has two access openings 521 which are configured to permit access to the screw bolts 43,23, respectively.

In this embodiment, the biasing member 30 is a coil spring 30 which is sleeved on the cable body 922 of the front brake cable 920 in the accommodation chamber 520, and which has an engaging end 301 disposed on the upper surface 412 of the first block 40, and a free end 302 that is opposite to the engaging end 301 and that confronts the ceiling wall 53.

Each of the tubular protective members 60 is sleeved on the cable body 922,912 of a respective one of the front and rear brake cables 920,910, and is disposed between the ceiling wall 53 and a respective one of the front and rear brake levers 92,91. Each of the positioning members 70 is connected to the respective brake lever 92,91, and has a tubular wall 71 surrounding the respective tubular protective member 60, and a screw bolt 72 threadedly extending through the tubular wall 71 to tightly abut against the respective tubular protective member 60 so as to secure the respective tubular protective member 60 to the respective brake lever 92,91.

Figure 6:
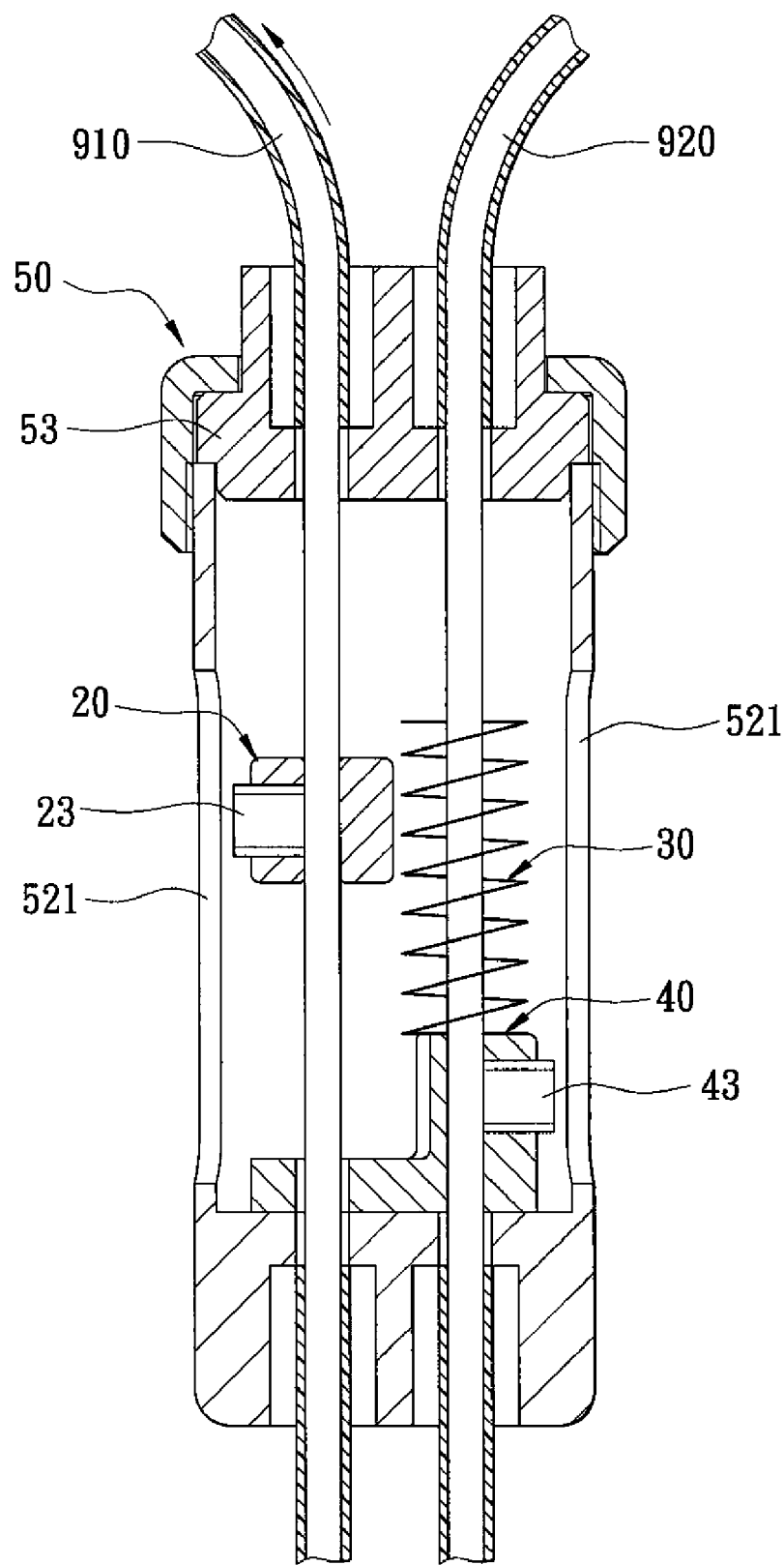
FIG. 6 is a sectional view of the preferred embodiment in a rear wheel braking state.
Figure 7:
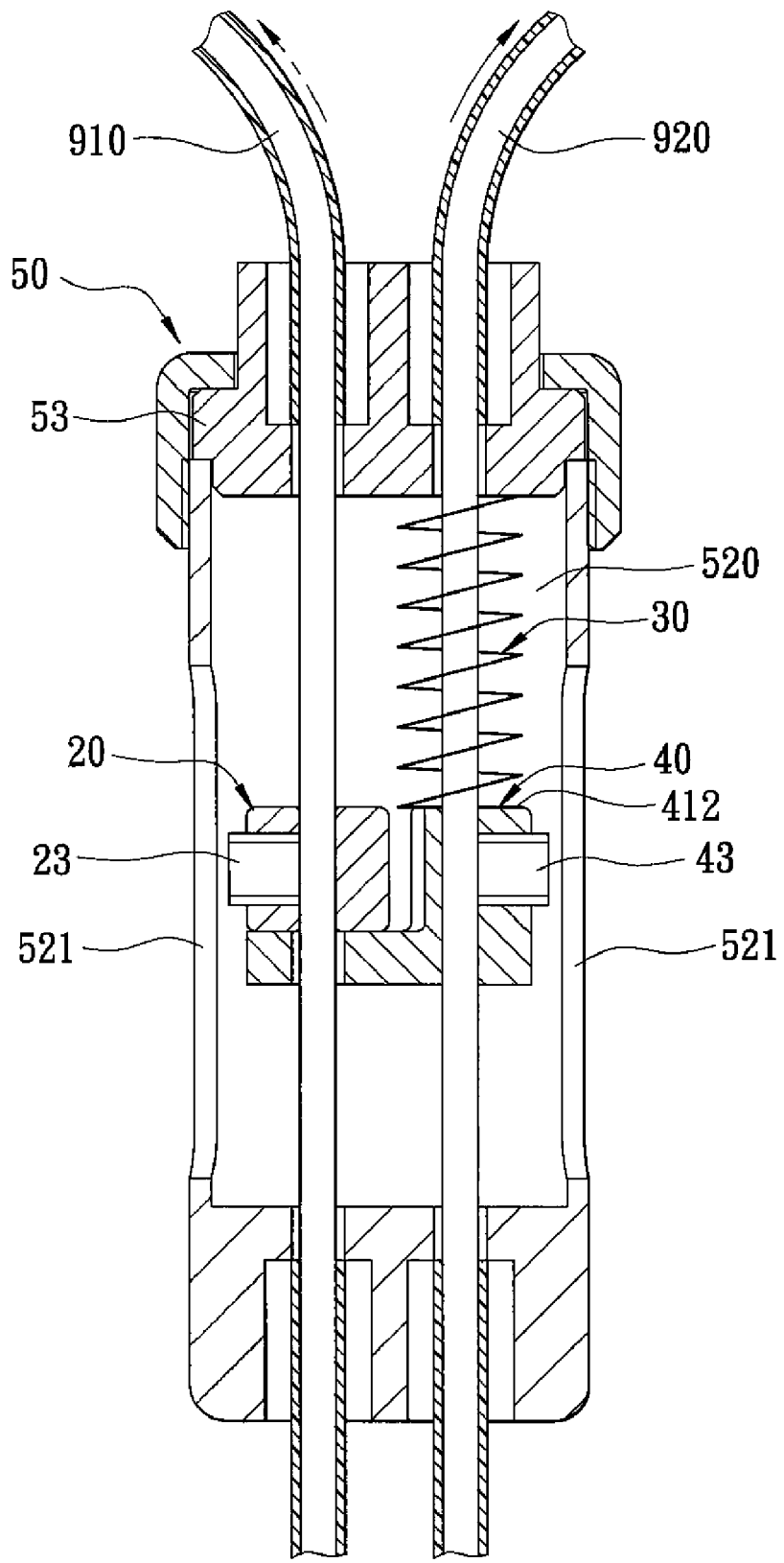
FIG. 7 is a sectional view of the preferred embodiment in a front wheel braking state.

As shown in FIG. 6, when the rear brake cable 910 is pulled by activation of the rear brake lever 91, the second block 20 is moved toward the ceiling wall 53 with the rear brake cable 910 to deliver a braking force to the rear wheel (not shown) of the bicycle. As shown in FIG. 7, when the front brake cable 920 is pulled by activation of the front brake lever 92, the first block 40 is caused to move toward the ceiling wall 53 and lift the second block 20 toward the ceiling wall 53 so as to pull the rear brake cable 910, thereby delivering braking forces to both the rear and front wheels (not shown) of the bicycle. When the first block 40 is being moved toward the ceiling wall 53, the coil spring 30 can effect a biasing force to counteract a pulling force applied to the front brake cable 920 by the front brake lever 92 so that an abrupt delivery of a large braking force through the distal end of the front brake cable 920 can be prevented while the smoothness of an initiation of a pulling action is not undesirably compromised. Thus, abrupt stopping of the front wheel can be prevented to thereby avoid locking of the front wheel and even turning over of the bicycle. In addition, by means of the coil spring 30, the upper surface 412 of the first block 40 can be prevented from engaging the ceiling wall 53 so as to avoid deformation and displacement of the first block 40.

Further, when it is desired to remove the device 200 of this invention from the bicycle, the first and second blocks 40,20 can be easily unlocked with a hand tool that is inserted into the accommodation chamber 520 from the access openings 521 so as to release the connection between the first block 40 and the front brake cable 920, and between the second block 20 and the rear brake cable 910.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A brake-action synchronizing device for a two-wheeled vehicle, the vehicle including front and rear brake levers, and front and rear brake cables each having a proximate end that is connected to a respective one of the front and rear brake levers, a distal end that is disposed to deliver a braking force when the respective one of the front and rear brake levers is operated to pull the proximate end, and a cable body that is interposed between the proximate and distal ends, said brake-action synchronizing device comprising:

a housing defining an accommodation chamber which is adapted to receive the cable bodies of the front and rear brake cables so as to permit movement of the cable bodies along first and second routes, respectively, in a longitudinal direction, said accommodation chamber extending in the longitudinal direction to terminate at ceiling and bottom walls;

a force imparting unit including
 a first block which has an upper portion extending in the longitudinal direction to terminate at an upper surface and defining a height, a lower portion that is opposite to said upper portion in the longitudinal direction, and a first passage that extends through said upper and lower portions and along the first route for passage of the cable body of the front brake cable therethrough, a first fastening member disposed to secure said first block to the cable body of the front brake cable such that, when the front brake lever is in a non-activated state, said lower portion is brought to rest on said bottom wall, and a stage extending from said lower portion across the second route, and having an abutment surface which confronts said bottom wall, and a lifting surface which is opposite to said abutment surface in the longitudinal direction and which is lower than said upper surface by said height, said stage having a bore which extends along the second route and through said abutment and lifting surfaces, and which is configured to permit the cable body of the rear brake cable to move freely when the rear brake lever is operated; and a second block which has a lifted surface confronting said lifting surface, and which is secured to move with the cable body of the rear brake cable along the second route such that, when the rear brake lever is in a non-activated state, said lifted surface is kept in contact with said lifting surface.

2. The brake-action synchronizing device according to claim 1, wherein said second block has a second passage extending therethrough along the second route, each of said first and second passages being configured to permit the cable body of a respective one of the front and rear brake cables to be engagingly led therethrough.

3. The brake-action synchronizing device according to claim 2, further comprising a second fastening member disposed to secure said second block to the cable body of the rear brake cable, each of said first and second blocks having a threaded hole which extends radially relative to a respective one of said first and second passages, each of said first and second fastening members being a screw bolt which is threadedly engaged with said threaded hole so as to tightly abut against the cable body of the respective one of the front and rear brake cables.

4. The brake-action synchronizing device according to claim 3, wherein said housing includes a surrounding wall which is disposed between said ceiling and bottom walls and which defines said accommodation chamber, said surrounding wall having two access openings which are configured to permit access to said screw bolts respectively.

5. The brake-action synchronizing device according to claim 1, further comprising a biasing member disposed to effect a biasing force to counteract a pulling force applied to the proximate end of the front brake cable by said front brake lever when said upper surface of said first block is pulled to be close to said ceiling wall so that an abrupt delivery of a large braking force through the distal end of the front brake cable can be prevented.

6. The brake-action synchronizing device according to claim 5, wherein said biasing member is a coil spring which has an engaging end disposed on said upper surface, and a free end that is opposite to said engaging end and that confronts said ceiling wall so as to prevent said upper surface from engaging said ceiling wall when the front brake lever is activated to pull the cable body of the front brake cable.

7. The brake-action synchronizing device according to claim 6, wherein said coil spring is configured to be sleeved on the cable body of the front brake cable in said accommodation chamber.

8. The brake-action synchronizing device according to claim 1, wherein said abutment surface of said stage is integrally formed with and is flush with said lower portion of said first block.

9. The brake-action synchronizing device according to claim 1, further comprising two tubular protective members, each of which is disposed between said ceiling wall and a respective one of the front and rear brake levers and is adapted to be sleeved on the cable body of a respective one of the front and rear brake cables, and two positioning members, each of which is disposed to secure a respective one of said tubular protective members to the respective one of the front and rear brake levers.

* * * * *